Figure 1:
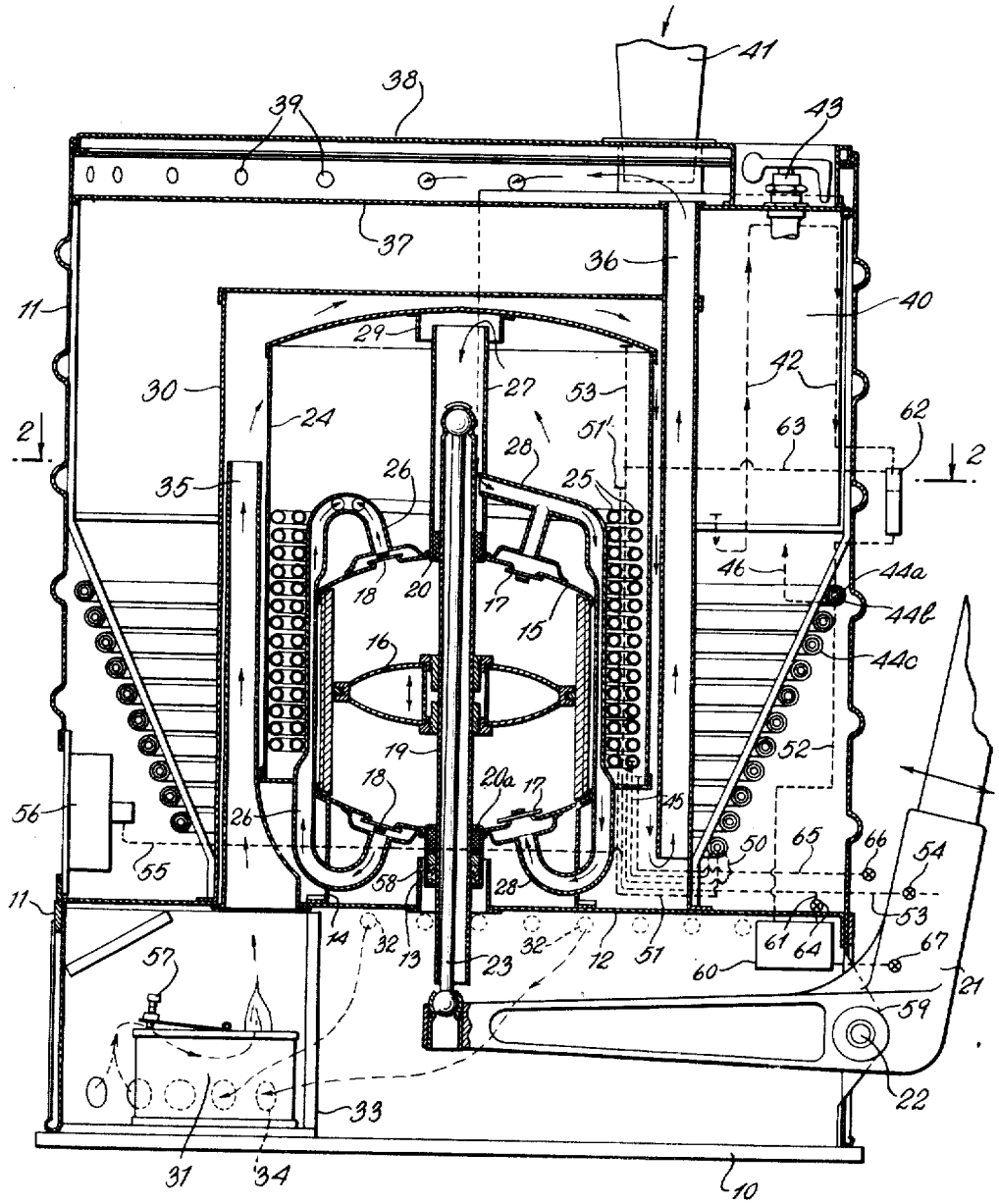

May 3, 1949. A. LATHAM, JR 2,469,122
VAPOR COMPRESSION TYPE STILL
Filed April 3, 1945 2 Sheets-Sheet 2

INVENTOR
Allen Latham Jr.
BY Kenyon & Kenyon
ATTORNEYS

Patented May 3, 1949

2,469,122

UNITED STATES PATENT OFFICE 2,469,122

VAPOR COMPRESSION TYPE STILL

Allen Latham, Jr., Jamaica Plain, Mass., assignor to Arthur D. Little, Inc., Cambridge, Mass., a corporation of Massachusetts Application April 3, 1945, Serial No. 586,357

15 Claims. (Cl. 202—182)

This invention relates to distillation apparatus and relates particularly to distillation apparatus adapted for carrying on a distillation operation of the vapor-compression type.

In a distillation operation of the vapor-compression type a solution to be distilled is vaporized in a vaporization zone, the evolved vapor is compressed until the condensing temperature of the compressed vapor is above the boiling point of the solution in the vaporization zone, and the compressed vapor is directed into out-of-contact heat exchange relation with the solution in the vaporization zone for giving up its latent heat of condensation to the solution in the vaporization zone.

The term solution is used broadly herein and in the claims as referring to any more or less concentrated solution of solids, liquids, or gases in a medium that is liquid under the maintained conditions of temperature and pressure, and the term distillation is used broadly as referring to any operation wherein vapor is caused to be separated from a solution.

It is a purpose of this invention to provide novel distillation apparatus whereby the efficiency of distillation of the vapor-compression type may be increased. It is a further object of this invention to provide novel means for counteracting heat losses in apparatus for carrying on a distillation operation of the vapor compression type. It is a further object of this invention to provide a compact, light weight unit for carrying on a distillation operation of the vapor compression type and to provide a unit of this character which can be successfully operated using manual actuation as the primary or sole source of energy input.

It is a feature of this invention that the compressor part of distillation apparatus of the vapor compression type is located within the vaporization chamber so that the vaporization chamber is disposed about the compressor, thereby utilizing the mechanical energy supplied to the compressor essentially in its entirety, not only in the form of pressure imparted to vapors but also in the form of sensible heat resulting from friction and other inefficiencies of the compressor. It is a further feature of this invention that sensible heat losses are counteracted by supplying hot combustion gases and that the hot combustion gases are caused by appropriate means to bathe the peripheral wall of the vaporization chamber.

It is a further feature of this invention that there is a preheater heat exchanger for heating incoming feed by out-of-contact heat exchange with hot effluent fluids and that the preheater heat exchanger is disposed about the vaporization chamber. It is a further feature of this invention that the apparatus is encased in a common casing whereby losses of heat from the system are reduced to a minimum and the energy derived by mechanical operation of the compressor and any heat supplied by hot combustion gases are availed of so as to afford extremely high efficiency in the utilization of energy input. Further features of this invention relate to the pressure equalizing lines whereby the apparatus may be operated at reduced pressure within the vaporization chamber, while permitting feed of fresh solution and removal of concentrated solution.

Figure 2:
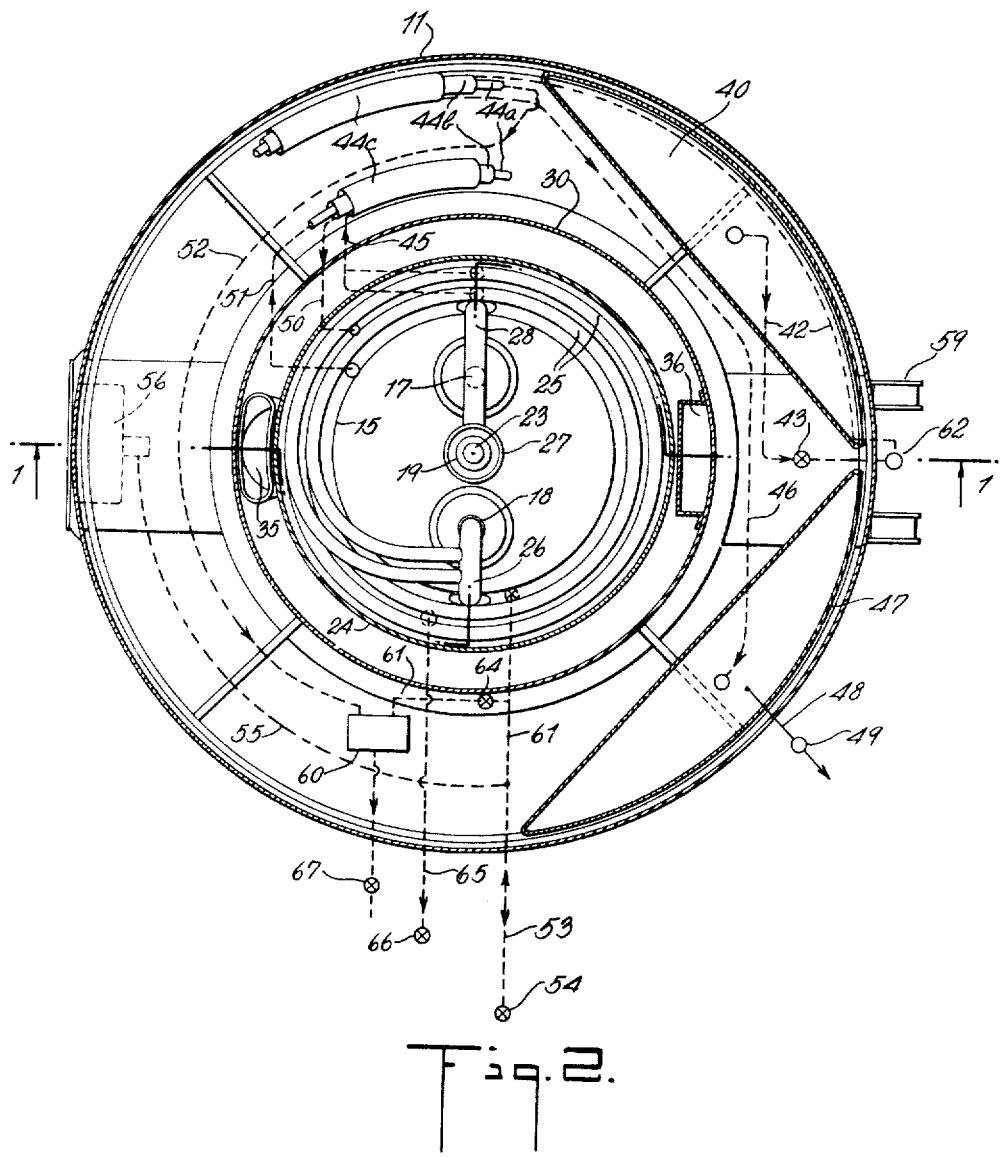

Further purposes, features and advantages of this invention will be apparent in connection with the following description of a typical embodiment of this invention which is shown merely for the purpose of exemplification in the accompanying drawing, wherein Fig. 1 is a side elevation principally in section of the distillation apparatus embodying the invention, certain of the lines being indicated diagrammatically, and Fig. 2 is a plan view of the apparatus along the line 2—2 of Fig. 1, Fig. 1 being along the line 1—1 of Fig. 2.

The apparatus shown in the drawing comprises a circular base plate 10 for supporting the cylindrical casing 11. Spaced from the base plate 11 is the support plate 12 which supports the principal elements of the distillation unit. Centrally located in the apparatus and supported by members 13 and 14 from support plate 12 is the compressor 15 which is provided with a double acting piston 16 and inlet valves 17 and outlet valves 18. A hollow piston rod 19 runs up through the center of the compressor through bushings 20 and 20a, the latter bushing being kept tight by the spring 58. The piston is operated by means of the manually operated lever handle 21 (not shown in Fig. 2) which is pivoted for rocking about the shaft 22 which is supported by journals 59. The inner end of the lever handle is connected with the upper end of the tubular piston rod 19 by the connecting rod 23 which is pivoted at each end as shown. By rocking the lever handle back and forth it is apparent that the piston 16 can be caused to reciprocate within the compressor.

The compressor 15 is disposed centrally within the vaporization chamber 24, the peripheral wall of the compressor forming an inner wall of the vaporization chamber leaving an annular portion of the vaporization chamber between the compressor wall and the outer wall of the vaporization chamber. In this annular portion of the vaporization chamber are coils of tubing which provide a heat exchanger 25 for maintaining a fluid in out-of-contact heat exchange relation with solution within the vaporization chamber. The coils of heat exchanger 25 are connected to the outlet valves 18 on the compression side of the compressor by the line 26. Vapor evolved from the solution in the vaporization chamber is taken to the low pressure side of the compressor through the tube 27 and the line 28 to the inlet valves 17 of the compressor. As shown, it is normally desirable to extend the tube 27 to adjacent the top of the vaporization chamber and to provide baffles 29 so as to minimize the passage of any entrained droplets of solution into the tube 27.

Disposed about the vaporization chamber and spaced therefrom is the hot gas chamber 30. Hot gases are supplied by means of the burner 31 which contains a supply of fuel. Air for combining with the fuel is admitted through the openings 32 in the casing 11. Preferably the burner is protected by a shield member 33 having holes 34 therein so that the incoming supply of air can reach the burner along the lines of travel indicated. The heated combustion gases pass upwardly through the hot flue 35. The space between the wall of the hot gas chamber 30 and the outer wall of the vaporization chamber provides flue passage means whereby the hot gases are brought in contact with the periphery of the vaporization chamber and in out-of-contact heat exchange relation with the solution within the vaporization chamber. The gases of combusion eventually flow from the chamber 30 through the outlet flue 36 to the space between the top walls 37 and 38 of the overall casing 11 and escape through the openings 39 to the atmosphere. In utilizing the arrangement above described the hot combustion gases are not relied upon to supply the energy for causing the solution to boil in the vaporization chamber for such energy is primarily brought into the system by operation of the compressor. However, by employment of the hot combustion gases, heat losses resulting from radiation from the vaporization chamber are counteracted and, to the extent that heat is supplied to solution in the vaporization chamber, the energy required to be furnished by operation of the compressor is reduced, which is advantageous.

Within the casing 11 is a tank 40 that is of arcuate cross section, which tank acts as a reservoir and can be supplied with solution to be distilled from time to time through a receiving mouth 41. The solution is taken from the tank 40 by line 42 which is controlled by the control valve 43 so as to regulate the flow of solution into the system. Since the vaporization chamber is usually operated at subatmospheric pressure, the control valve 43 can, as shown, be positioned somewhat above the level of the solution in the tank 40. The solution is directed by the line 42 to the annular space between the inner tube 44a and the intermediate tube 44b of the concentric tubes 44a, 44b, 44c which are disposed as a coil and constitute the preheater heat exchanger for preheating the incoming feed by out-of-contact heat exchange with distillate taken from the heat exchanger 25 and with hot concentrated solution taken from the vaporization chamber 24. The distillate from the heat exchanger 25 is directed by line 45 to the space between the tubes 44b, 44c for counterflow in heat exchange relation with the incoming feed. After the distillate has given up its heat, it is directed by the line 46 to the distillate reservoir or storage tank 47 which can be tapped whenever desired by tap line 48 controlled by the valve 49. It is to be noted that the preheater heat exchanger is disposed about the vaporization chamber and about the hot gas chamber which not only constitutes a compact arrangement but likewise minimizes heat losses from the vaporization chamber and compressor. The preheated feed is directed from the space between the tubes 44a and 44b by the line 50 to the bottom of the vaporization chamber for admission into the body of solution in the vaporization chamber.

The concentrated solution is withdrawn from the vaporization chamber by the line 51 to the interior of the inner tube 44a for counterflow heat exchange with the incoming feed and thence by line 52 out of the system, the line 52 being controlled by valve 57. The normal liquid level of solution in the vaporization chamber is determined by the mouth 51' at the upper end of the line 51. Since the region in the vaporization chamber above the normal liquid level is normally under slight vacuum, the valve 57 is normally kept closed and is opened from time to time in order to withdraw the concentrated solution. When the valve 57 is opened, outside air can be admitted into the vaporization chamber through the air line 53 by opening the valve 54, thereby permitting the concentrated solution to flow out through the line 51. Upon closing the valves 57 and 54 again the distillation operation may be resumed.

The tank 60 is connected into the concentrated solution line 52, the tank 60 being likewise connected with air line 53 by line 61 controlled by valve 64. In this manner, when valve 64 is open any concentrated solution in the vaporization chamber above the mouth 51' of line 51 will be free to flow down into the tank 60 until the tank 60 is filled, at which time the tank 60 can be emptied by opening the drain valve 67. The rate of flow of feed can be observed through the sight glass 62 in line 42. The sight glass 62 also acts as a level glass whereby the level of the solution in the vaporization chamber may be observed. The sight glass 62 has the pressure therein equalized with respect to the pressure within the vaporization chamber as by the line 63 which connects the upper portion of the sight glass with the air line 52. If desired the tank 60 can be omitted and the concentrated solution can be taken directly from the vaporization chamber out of the system and without heat exchange with the incoming feed by opening the valve 67 (and valve 54) from time to time whenever the liquid level rises substantially above the level of mouth 51' of line 51.

The air line 53 has connected thereto the line 55 which leads to the pressure sensitive fire control gauge 56. If the pressure indicated on the gauge 56 falls below the desired pressure to be maintained within the vaporization chamber, the flame of the burner 31 can be increased by the adjustment means 57 so as to supply more heat and so as to tend to elevate the pressure. Conversely the flame can be decreased if the pressure indicated on the gauge 56 rises above that which is desired in the vaporization chamber.

The vaporization chamber may be provided with a drain line 65 controlled by valve 66, so as to drain the vaporization chamber when the device is not in use.

The operation of the device may be illustrated in connection with the production of distilled water from sea water. The reservoir 40 is filled with sea water and the pumping is started so as to reduce the pressure in the vaporization chamber and suck the sea water therein until the normal liquid level is reached: The feed control valve 43 is then closed and the valves 67 and 54 are closed. The burner 31 is lighted and the pumping is continued. After a time sufficient energy will have been introduced into the system to heat the sea water in the vaporization chamber to its boiling point with resultant formation of vapor which is condensed in the heat exchanger 25 and is discharged as distilled water into the distilled water tank 47. After the production of distilled water has commenced, additional feed can be admitted into the vaporization zone as may be required, and, whenever necessary, concentrated solution may be withdrawn from the unit. During operation, the pressure differential between the high and low pressure sides of the compressor will usually be of the order of 1½ to 3 pounds per square inch.

A device of the character above described is especially suitable for small portable units. For example, such units are suitable as equipment for life rafts and the like or under other circumstances where large and heavy units are impractical or where there is no convenient source of power or fuel. A device of the character above described may be operated without the auxiliary burner if necessary, but in such case the yield for a given amount of pump operation is reduced. As mentioned above the auxiliary burner is intended primarily to prevent heat losses from the vaporization chamber, and accomplishes the purpose more effectively and with considerably less weight than if a very thick layer of thermal heat insulation material were used to surround all or part of the apparatus. It is not without the scope of this invention, however, to omit the auxiliary burner, and if desired, employ a very thick thermal heat insulation material to cut down heat losses. It is normally preferable, however, to employ the auxiliary burner, and to surround the casing with a light layer of thermal insulation material.

In a small unit of the character mentioned, where the compressor is operated manually, it is of extreme importance that the unit be capable of very efficient operation. The arrangement that has been described affords greatly improved efficiency and it is because of this fact that the unit is practical even when operated manually. Of course, the improved efficiency likewise is advantageous even though the compressor is operated by a suitable motor.

The embodiment of this invention which has been, for the purpose of exemplification, herein described, is subject to considerable variation. In the device shown, a reciprocating compressor is shown. If a reciprocating type compressor is employed, it is normally desirable that the piston be made of bronze and that side walls of the cylinder be lined with a plastic resin composition such as resin composition having as a base a phenol aldehyde resin or a melamine resin. When such a combination is employed, and the device is used for producing distilled water, no lubricant other than the lubrication provided by the steam is required. Moreover, the resinous material has some heat insulating effect which minimizes condensation of vapor on the inner wall of the cylinder. If desired, some other type of compressor may be employed, e. g. a compressor of the rotary type. If desired some other type of heat exchange arrangement may be used both for the heat exchanger within the vaporization chamber and for the preheater heat exchanger. Thus, if desired, the preheater heat exchanger can be made in lengths of straight tubing to facilitate assembly and cleaning.

The other elements of the apparatus may likewise be varied. Thus the arrangement of the tubing and other fluid carrying lines can be widely varied. Somewhat more generally, the specific embodiments herein described and shown in the drawings are merely illustrative and the apparatus may be varied within the scope of this invention as defined by the language of the following claims.

I claim:

1. Distillation apparatus of the vapor compression type comprising a mechanical compressor adapted to compress vapor by mechanical compression thereof, a vaporization chamber which is disposed about said compressor and which is arranged to confine therewithin for transmission to fluid within said vaporization chamber sensible heat of the compressor generated during operation thereof, a heat exchanger within said vaporization chamber, means for directing vapor from said vaporization chamber to said compressor for compression therein, means for directing compressed vapor from said compressor to said heat exchanger in out-of-contact heat exchange relation with said solution in said vaporization chamber, means for introducing solution to be distilled into said vaporization chamber, means for withdrawing concentrated solution from said vaporization chamber, and means for withdrawing distillate from said heat exchanger, said apparatus being adapted to maintain a substantially higher pressure within said heat exchanger than the pressure within said vaporization chamber upon actuation of said compressor to compress therein vapor directed thereto from said vaporization chamber and directed therefrom to said heat exchanger.

2. Distillation apparatus of the vapor compression type comprising a vaporization chamber, a mechanical compressor which is adapted to compress vapor by mechanical compression thereof and which is disposed within said vaporization chamber, a heat exchanger within said vaporization chamber which is adapted to maintain a fluid in out-of-contact heat exchange relation with solution in said vaporization chamber, means for directing vapor evolved from solution in said vaporization chamber to said compressor for compression therein, means for directing compressed vapor to said heat exchanger for condensation therein in out-of-contact heat exchange relation with solution in said vaporization chamber, feed means for directing fresh solution into said vaporization chamber, means for directing distillate from said heat exchanger, preheater heat exchange means for bringing said withdrawn distillate in out-of-contact heat exchange relation with fresh solution in said feed means, and means for withdrawing concentrated solution from said vaporization chamber, said preheater heat exchange means being disposed about and surrounding said vaporization chamber in proximate relation thereto.

3. Distillation apparatus of the vapor compression type comprising a vaporization chamber, a mechanical compressor which is adapted to compress vapor by mechanical compression thereof and which is disposed within said vaporization chamber, a heat exchanger within said vaporization chamber which is adapted to maintain a fluid in out-of-contact heat exchange relation with solution in said vaporization chamber, means for directing vapor evolved from solution in said vaporization chamber to said compressor for compression therein, means for directing compressed vapor to said heat exchanger for condensation therein in out-of-contact heat exchange relation with solution in said vaporization chamber, feed means for directing fresh solution into said vaporization chamber, means for directing distillate from said heat exchanger, preheater heat exchange means for bringing said withdrawn distillate in out-of-contact heat exchange relation with fresh solution in said feed means, means for withdrawing concentrated solution from said vaporization chamber, burner means for producing heated combustion gases, means for directing said heated combustion gases for out-of-contact heat exchange relation with solution in said vaporization chamber and a common casing disposed about and enveloping in proximate spaced relation thereto said vaporization chamber, said compressor, said preheater heat exchange means, said burner means and said means for directing heated combustion gases for out-of-contact heat exchange relation with solution in said vaporization chamber.

4. Distillation apparatus according to claim 3 wherein said heated combustion gases are directed about peripheral surface of said vaporization chamber.

5. Distillation apparatus of the vapor compression type comprising a vaporization chamber, a mechanical compressor which is adapted to compress vapor by mechanical compression thereof and which is disposed centrally within said vaporization chamber for direct contact of peripheral surface thereof with solution within said vaporization chamber, a heat exchanger disposed within said vaporization chamber and about said compressor that is adapted to maintain a fluid in out-of-contact heat exchange relation with solution in said vaporization chamber, means for directing vapor evolved from solution in said vaporization to said compressor for compression therein, means for directing compressed vapor to said heat exchanger for condensation therein in out-of-contact heat exchange relation with solution in said vaporization chamber, flue passage means disposed about the peripheral surface of said vaporization chamber, burner means for supplying hot combustion gases, means for directing hot combustion gases through said flue passage means, feed means for directing fresh solution into said vaporization chamber, means for directing heated distillate from said heat exchanger, preheater heat exchange means arranged to direct said heated distillate in out-of-contact counterflow heat exchange relation with incoming feed supplied by said feed means, said preheater heat exchange means being disposed about and surrounding said flue passage means, and means for withdrawing concentrated solution from said vaporization chamber.

6. Distillation apparatus according to claim 5 which comprises a common casing about said vaporization chamber, said flue passage means, and said preheater heat exchange means.

7. Distillation apparatus of the vapor compression type comprising a vaporization chamber, burner means for producing hot combustion gases, means for directing hot combustion gases from said burner means in out-of-contact heat exchange with solution in said vaporization chamber, a compressor, means for directing vapor from said vaporization chamber to said compressor for compression therein, a heat exchanger within said vaporization chamber, means for directing compressed vapor from said compressor to said heat exchanger in out-of-contact heat exchange relation with solution in said vaporization chamber, feed means for introducing fresh solution into said vaporization chamber, means for withdrawing distillate from said heat exchanger in out-of-contact counterflow heat exchange with fresh solution in said feed means, means for withdrawing concentrated solution from said vaporization chamber and a common casing about and enveloping said vaporization chamber, said compressor and said burner means in proximate spaced relation thereto.

8. Distillation apparatus according to claim 7 which includes means for directing hot combustion gases produced by said burner means about the peripheral surface of said vaporization chamber.

9. Distillation apparatus which comprises a vaporization chamber, a compressor, a heat exchanger within said vaporization chamber adapted to maintain a fluid in out-of-contact heat exchange relation with solution in said vaporization chamber, means for directing vapor from said vaporization chamber to said compressor for compression therein, means for directing compressed vapor from said compressor to said heat exchanger for condensation therein, means for withdrawing distillate from said heat exchanger, feed means for introducing fresh solution into said vaporization chamber, a draw off line for withdrawn concentrated solution from said vaporization chamber, container means arranged to collect concentrated solution withdrawing from said vaporization chamber by said draw off line, a pressure equalizing line affording communication between said container means and the vapor region of the vaporization chamber, the interior of said container means being sealed from the outside atmosphere and being provided with optionally operable means for removing concentrated solution from said container means and out of the system.

10. Distillation apparatus according to claim 9 which includes valve controlled means for providing communication between the vapor region of the vaporization chamber and the surrounding atmosphere.

11. Distillation apparatus according to claim 9 which includes a sight glass in the feed means arranged at the normal liquid level of solution in said vaporization chamber, a pressure equalizing line providing communication between the upper portion of the sight glass and the vapor region of the said vaporization chamber, and control means for controlling the rate of feed into the system.

12. Distillation apparatus according to claim 9 which includes preheater heat exchange means arranged to bring concentrated solution withdrawn from said vaporization chamber by said draw off line into out-of-contact heat exchange relation with incoming feed directed to said vaporization chamber by said feed means, said preheater heat exchange means being situated in said draw-off line between said vaporization chamber and said container means.

13. Distillation apparatus of the vapor compression type comprising a vaporization chamber, a mechanical compressor adapted to compress vapor by mechanical compression thereof, means for directing vapor from said vaporization chamber to said compressor for compression therein, a condenser heat exchanger within said vaporization chamber, means for directing compressed vapor from said compressor to said condenser heat exchanger for condensation therein in out-of-contact heat exchange relation with solution in said vaporization chamber, means for introducing solution to be distilled into said vaporization chamber, means for withdrawing concentrated solution from said vaporization chamber, and means for withdrawing distillate from said condenser heat exchanger, said compressor being within said vaporization chamber with peripheral surfaces thereof disposed for direct contact with solution within said vaporization chamber, said condenser heat exchanger surrounding said compressor, and said apparatus being adapted to maintain a substantially higher pressure within said condenser heat exchanger than the pressure within said vaporization chamber upon actuation of said compressor to compress therein vapor directed thereto from said vaporization chamber and directed therefrom to said condenser heat exchanger.

14. Distillation apparatus of the vapor compression type comprising a vaporization chamber, a mechanical compressor adapted to compress vapor by mechanical compression thereof, means for directing vapor from said vaporization chamber to said compressor for compression therein, a condenser heat exchanger within said vaporization chamber and spaced substantially from said compressor, means for directing compressed vapor from said compressor to said condenser heat exchanger for compression therein, means for introducing solution to be distilled into said vaporization chamber, means for withdrawing concentrated solution from said vaporization chamber, and means for withdrawing distillate from said condenser heat exchanger, said apparatus including heat confining and transferring means which comprises peripheral wall of said compressor and which is adapted to confine sensible heat of the compressor generated during operation thereof within said vaporization chamber and to transfer said sensible heat of the compressor through said wall of said compressor and independently of said condenser heat exchanger to solution within said vaporization chamber.

15. Distillation apparatus of the vapor compression type comprising a vaporization chamber, a mechanical compressor adapted to compress vapor by mechanical compression thereof, means for directing vapor from said vaporization chamber to said compressor for compression therein, a condenser heat exchanger within said vaporization chamber, means for directing compressed vapor from said compressor to said condenser heat exchanger for compression therein, means for introducing solution to be distilled into said vaporization chamber, means for withdrawing concentrated solution from said vaporization chamber, and means for withdrawing distillate from said condenser heat exchanger, said compressor being within said vaporization chamber with peripheral surfaces thereof in direct contact with fluid within said vaporization chamber.

ALLEN LATHAM, Jr.

REFERENCES CITED

The following references are of record in the file of this patent:

UNITED STATES PATENTS

| Number | Name | Date |
| --- | --- | --- |
| 585,943 | Waterhouse | July 6, 1897 |
| 1,481,924 | Nelson | Jan. 29, 1924 |
| 1,537,563 | Suczek | May 12, 1925 |
| 2,185,595 | Kleinschmidt | Jan. 2, 1940 |
| 2,185,596 | Kleinschmidt | Jan. 2, 1940 |
| 2,368,665 | Kohman | Feb. 6, 1945 |
| 2,375,640 | Ford | May 8, 1945 |

FOREIGN PATENTS

| Number | Country | Date |
| --- | --- | --- |
| 56,864 | Austria | Dec. 27, 1912 |
| 349,182 | Germany | Feb. 24, 1922 |